(12) United States Patent
Segato

(10) Patent No.: US 8,371,649 B2
(45) Date of Patent: Feb. 12, 2013

(54) BICYCLE SADDLE STRUCTURE AND METHOD OF ASSEMBLY THEREOF

(75) Inventor: Stefano Segato, Vicenza (IT)

(73) Assignee: Selle Royal S.p.A., Pozzoleone (Vicenza) (IT)

( * ) Notice: Subject to any disclaimer, the term of this patent is extended or adjusted under 35 U.S.C. 154(b) by 339 days.

(21) Appl. No.: 12/594,521

(22) PCT Filed: Apr. 3, 2008

(86) PCT No.: PCT/IB2008/051245
§ 371 (c)(1),
(2), (4) Date: Oct. 2, 2009

(87) PCT Pub. No.: WO2008/122933
PCT Pub. Date: Oct. 16, 2008

(65) Prior Publication Data
US 2010/0244508 A1    Sep. 30, 2010

(30) Foreign Application Priority Data
Apr. 4, 2007  (IT) .............................. VI2007A0106

(51) Int. Cl.
*A47C 31/00* (2006.01)

(52) U.S. Cl. ......... 297/219.11; 297/215.16; 297/440.22

(58) Field of Classification Search ............... 297/195.1, 297/215.16, 219.11, 204, 440.11, 440.22
See application file for complete search history.

(56) References Cited

U.S. PATENT DOCUMENTS

| | | | | |
|---|---|---|---|---|
| 420,060 A * | 1/1890 | Hanson | ...................... | 297/207 |
| 495,391 A * | 4/1893 | Cable | ............................ | 297/204 |
| 540,431 A * | 6/1895 | Garford | ........................ | 297/204 |
| 2,395,346 A * | 2/1946 | Schwinn | ....................... | 297/207 |
| 5,544,936 A * | 8/1996 | Bigolin | ....................... | 297/195.1 |
| 6,666,507 B1 * | 12/2003 | Ringgard | .................. | 297/195.1 |
| 7,059,673 B1 | 6/2006 | Lee | | |
| 7,192,085 B2 * | 3/2007 | Lee | ............................ | 297/195.1 |
| 7,735,916 B2 * | 6/2010 | Yu | ............................ | 297/215.16 |
| 7,887,137 B2 * | 2/2011 | Fisher et al. | ............... | 297/440.2 |
| 2004/0026967 A1 * | 2/2004 | Nelson | ....................... | 297/195.1 |
| 2004/0095009 A1 * | 5/2004 | Fisher et al. | ............... | 297/440.2 |
| 2005/0275255 A1 * | 12/2005 | Nelson | ....................... | 297/195.1 |
| 2006/0119147 A1 * | 6/2006 | Nelson | ....................... | 297/195.1 |
| 2008/0246314 A1 * | 10/2008 | Hung | .......................... | 297/195.1 |

FOREIGN PATENT DOCUMENTS

EP          1521702 A1    4/2005

* cited by examiner

*Primary Examiner* — David Dunn
*Assistant Examiner* — David E Allred
(74) *Attorney, Agent, or Firm* — Tutunjian & Bitetto, P.C.

(57) ABSTRACT

A bicycle saddle structure includes a load-bearing shell having an elongate front portion, a widened rear portion and a bottom surface with a front seat and a rear seat which are formed at a predetermined minimum distance (dMu\l) therebetween, rails with a rear end portion, and a front end portion which is designed to interact with the front seat of the shell. The rails have a maximum longitudinal extension (Ir) longer than the predetermined minimum distance (dMu\l) between the seats. The structure includes a cam linkage member which is designed to be interposed between the front seat of the shell and the front portion of the rails to cause the shell to be snap fitted to the rails. A method of assembly of the above bicycle saddle structure is also provided.

17 Claims, 4 Drawing Sheets

BICYCLE SADDLE STRUCTURE AND METHOD OF ASSEMBLY THEREOF

BACKGROUND

1. Technical Field

The present invention generally finds application in the field of sport and leisure accessories, and particularly relates to a bicycle saddle structure to be attached to a bicycle frame or the like and a method of assembly thereof.

2. Description of Related Art

Bicycle saddles of the above mentioned type typically include a shell of a substantially rigid material, having a narrow front portion and a widened rear portion, a user supporting top surface and rails, generally made of thread-like metal material for connection of the shell to a bicycle frame.

The shell is generally attached to the rails at its front and rear end portions via suitable anchor means.

In one known method of attachment, the rails are fixed to the shell first at the rear portion and then at the front portion thereof.

This step is carried out by forcing the specially shaped front portion of the rails into a suitable seat formed in the front part or "nose" of the shell.

For this purpose, the shell is introduced in a special tool that is operable to cause temporary elongation thereof and then sliding of the front portion of the rails along a ramp located at the nose that acts as a lead-in surface for the front portion of the rails into its seat.

The forced sliding motion of the rails along the ramp is caused by a predetermined load operating thereon to cause the required compressive deformation needed to move the front portion of the rails beyond the lower limit of such ramp and finally into its seat.

Now, once the lower limit of the ramp has been reached, the rails are released and move back into the unstressed configuration, and the special tool is also released to restore the shell to its initial configuration, thereby stabilizing the shell/rails connection.

This assembly method suffers from the apparent recognized drawback that both the shell and the rails are subjected to considerable stresses that often cause their failure, as well as plastic deformation that affects their mechanical properties.

Furthermore, as the rails fit into their seat, they almost instantaneously change from a maximum compression condition to a minimum compression condition, thereby transforming the elastic energy accumulated during deformation into kinetic energy which is impulsively transferred to the shell.

Therefore, the shell will be struck a heavy blow, which may often cause cracking or even, in extreme cases, failure.

In an attempt to obviate the above drawbacks, saddles have been developed in which the shell/rails connection involves no tensile and/or compressive stress.

Saddles are commonly available on the market, in which the rails are secured to the shell, at their respective front portions, by placing the rails onto the shell and later securing their front portion to the nose via a flexible support that can be removably attached to the shell by screw connection means.

Thus, the seat for the front portion of the rails will be defined by the support and the bottom surface of the shell. A similar arrangement is disclosed, for instance, in EP 1521702.

While this arrangement ensures quick and simple connection between the rails and the shell, it still suffers from the drawback that the holding force of the connection is only provided by the nose piece and particularly by the fastener member, which is apparently a weak point of the whole structure.

Therefore, the stresses that are typically transmitted to the saddle during riding may lead with time to failure at the fastening point and to disconnection of the shell from the rails, thereby apparently affecting rider's safety.

SUMMARY OF THE INVENTION

The object of this invention is to overcome the above drawbacks, by providing a bicycle saddle structure that achieves high efficiency and relative cost effectiveness.

A particular object is to provide a bicycle saddle structure that can be assembled in a highly simple and quick manner without requiring any special tool.

Yet another object is to provide a saddle structure that can be assembled in such a manner that no failure stresses occur in its parts during assembly.

A further object of the present invention is to provide a saddle structure in which the shell is constantly under tensile stress, so that light weight and high flexural strength are both ensured.

Yet another object of the invention is to provide a highly simple and quick bicycle saddle assembly method.

These and other objects, as better explained hereafter, are fulfilled by a bicycle saddle structure as defined in claim 1, which comprises a load-bearing shell defining a longitudinal axis and having an elongate front portion, a widened rear portion and a bottom surface with a front seat and a rear seat formed therein at a predetermined minimum distance therebetween, rails for attachment of said shell to a bicycle frame or the like and having a rear end portion designed to fit into said rear seat and a front end portion designed to interact with said front seat, said rails having a maximum longitudinal extension longer than said predetermined minimum distance between said seats.

The structure includes a cam connection member which is designed to be interposed between said front seat of said shell and said front portion of said rails to cause said shell to be snap fitted to said rails.

Thanks to this particular arrangement, during assembly of the structure, the rails will be subjected to a relatively small and gradual compression and the shell will be put under tensile stress in a gradual progressive manner.

Thus, shell/rails connection will be ensured without involving any transfer of impulsive stresses from the rails to the shell that might cause damages to the latter.

Advantageously, the cam connection member may include a main body and a front tooth formation which is insertable into the front seat of the shell to pivot about a first transverse axis.

Furthermore, the tooth formation may undergo a partial rotation by a first predetermined angle about the first axis to cause the rails to be partially shortened and the shell to be elongated, and a complete rotation by a second angle about the same transverse axis to cause at least partial stretching of the rails, to promote snap fit engagement of the rails, the cam member and the shell.

Thus, at the end of the second rotation motion, the rails will be subjected to partial decompression following their fixation to the shell and operation thereon, possibly via the cam member, to hold the shell under tensile stress, thereby increasing its flexural strength.

In another aspect, the invention relates to a method of assembly of a bicycle saddle structure of the type as defined in claims 1 to 10, comprising a step of coupling the rails to the shell. This step includes providing a cam connection member and interposing it between the front seat of the shell and the front portion of the rails to cause the shell to be snap-fitted to the rails.

With the method of the invention, the structure may be assembled in a quite quick and simple manner, without using special tools.

A manually operable cam member will be sufficient therefor, no system being required for stretching the shell and for compressing the rails and fitting them therein.

BRIEF DESCRIPTION OF THE DRAWINGS

Further features and advantages of the invention will be more apparent upon reading of the detailed description of a preferred, non-exclusive embodiment of a saddle structure according to the invention and a method of assembly thereof, which are described as a non-limiting example with the help of the annexed drawings, in which.

DETAILED DESCRIPTION OF PREFERRED EMBODIMENTS

Referring to the above figures, the structure of the invention, generally designated by numeral 1, may be a saddle structure designed to be attached to a movable or stationary frame, not shown, such as the frame of a similar vehicle.

The structure may be also associated with an upper cover, also not shown and known per se, and possibly having a pad for more comfortably supporting a seated user.

Figure 1:
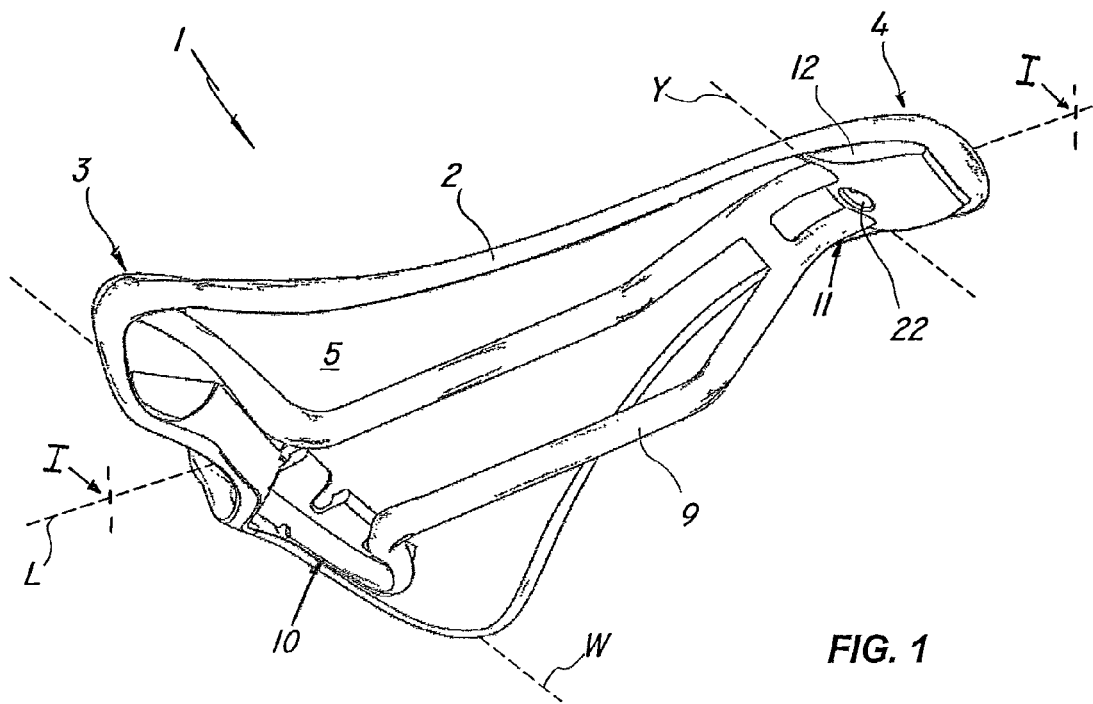
FIG. 1 is a bottom perspective view of a saddle structure of the invention.

As shown in FIG. 1, a structure of the invention comprises a load-bearing shell 2 defining a longitudinal axis L and having a widened rear portion 4, a front elongate portion 4, a bottom surface 5 and a top surface 6 designed to face towards the user.

At least one front attachment seat 7 and at least one rear attachment seat 8 are formed in the lower surface 5 at the front portion 4 and the rear portion 3 of the shell 2.

The structure 1 further comprises rails 9 to be attached to the bicycle frame, which have a rear end portion 10 designed to fit into the rear seat 8 and a front end portion 11 designed to interact with the front attachment seat 7 of the shell 2.

The rails 9 have a maximum longitudinal extension $l_f$ longer than the minimum distance $d_{MIN}$ between the front and rear attachment seats 7, 8 as measured along the longitudinal axis L.

According to a peculiar aspect of the invention, a cam connection member 12 is provided which is designed to be interposed between the front attachment seat 7 of the shell 2 and the front portion 11 of the rails 9 to cause the latter to be snap fitted to the shell 2.

In the arrangement as shown in the annexed figures, the rails 9 may be formed of a thread-like or wire metal body having a closed loop profile, with a widened rear 5 portion 10 and a substantially U-shaped tapered front portion 11.

Nonetheless, in one alternative embodiment, not shown and known per se, the rails 9 may be a pair of members substantially parallel, possibly joined at their respective front ends and free at the corresponding rear portions 10.

The shell 2 may in turn have a pair of rear attachment seats 8 formed at the bottom surface 5, each defining a cavity for receiving respective rear ends 10 of the rails 9, whereas a single front seat 7 may be provided for connection with the front portion of the rails 9.

Nevertheless, it shall be understood that the rear portion 3 of the shell 2 and the rear portion 10 of the rails may be connected together in any other manner known in the art without departure from the scope of the present invention.

Figure 6:
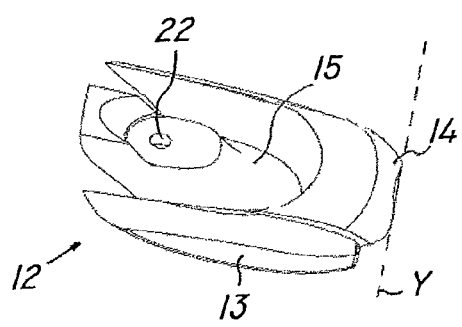
FIG. 6 is a perspective view of a cam member that is part of a structure of the invention.
Figure 7:
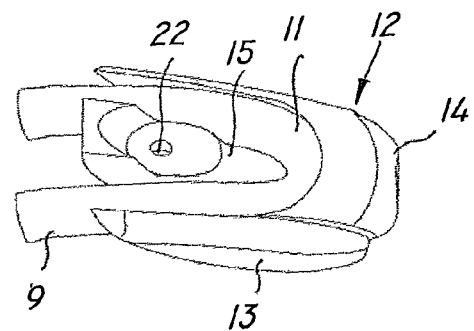
FIG. 7 is a perspective view of the cam member of FIG. 6 connected to rails.

As particularly shown in FIGS. 6 and 7, the cam member 12 may have a substantially elongate main body 13 and a front tooth formation 14 having a prevalently transverse extension with respect to the main body 13 and designed to at least partially fit into the front seat 7 of the shell 2.

Preferably, the front seat 7 may match in shape the tooth formation 14 of the cam member 12 thereby allowing stable fit thereof.

Furthermore, the main body 12 of the cam member 12 may have a specially shaped groove, which is longitudinally offset with respect to the tooth formation 14 and designed to receive and hold the front portion 11 of the rails 9, by being counter-shaped, e.g. with a U shape.

According to a preferred, non exclusive embodiment of the invention, the tooth formation 14 may be fitted into the front seat 7 to at least partially rotate about a first transverse axis Y, that might be substantially orthogonal to the longitudinal axis L, through a first rotation angle $ø_1$ for simultaneously causing progressive and controlled compression and tension of the rails 9 and the shell 2.

Therefore, the compression and tension will cause the rails 9 to be shortened and the shell 2 to be lengthened to such an extent as required by their respective dimensions and by the properties of the materials of which they are made.

Then, the tooth formation 14 may undergo a complete rotation through a second rotation angle $ø_2$ about the same first transverse axis Y to cause at least partial stretching of the rails 9.

Both compression and later stretching of the rails 9 and elongation of the shell 2 will be caused by the cam member 12 in a progressive and controlled manner, while preventing the rails 9 from transferring impulsive stresses to the shell 2 during its stretching motion, and from thereby causing damages to them.

The longitudinal dimensions $l_f$, $l_s$ of the rails 9 and the shell 2 may be selected to be such that, once their connection is complete, the shell 2 is still under tensile stress, with a consequent increase of its flexural strength.

Figure 5:
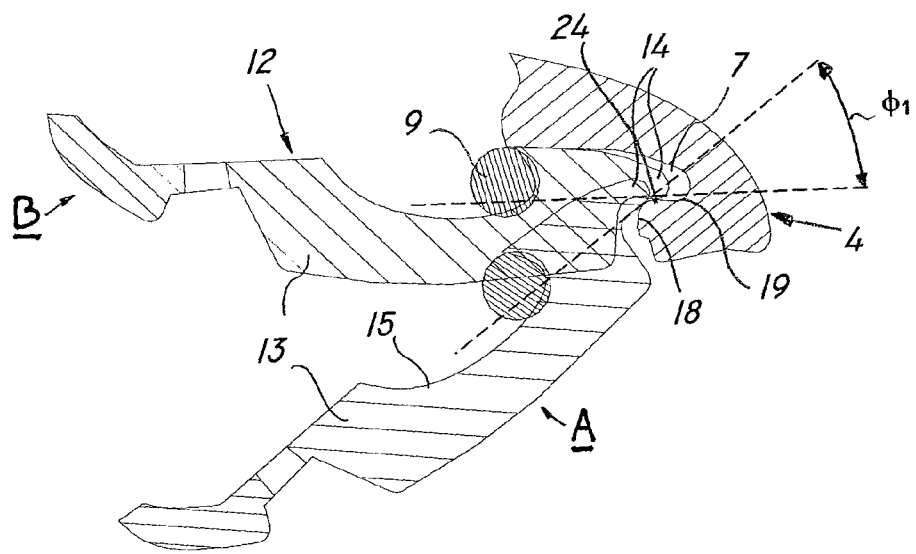
FIG. 5 is a sectional view of the detail of FIG. 4 in two different assembly steps.

FIG. 5 shows a sequence of connection of the rails 9 and the shell 2 with the cam member 12 of the invention interposed therebetween.

Particularly, the cam member 12 may be located in a starting position. A corresponding to the time of insertion of its tooth formation 14 in the front seat 7 of the shell 2.

In such position A, the rails 9 may have their rear portion 10 attached to the shell 2, whereas their front portion 11 will be received in the groove 15 of the cam member 12.

In the same figure, the cam member 12 is also shown in an intermediate position B which corresponds to the position reached at the end of the first rotation motion $ø_1$ about the first transverse axis Y.

Figure 4:
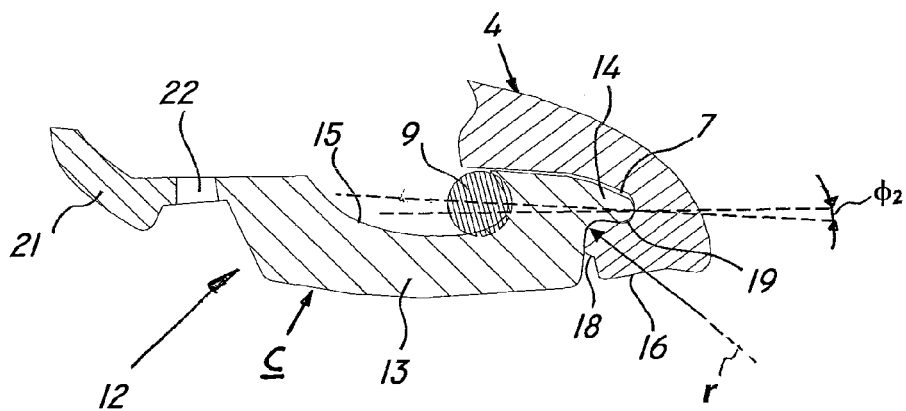
FIG. 4 is a sectional view of a detail of the structure of FIG. 1 as taken along the plane I-I.

FIG. 4 also shows the cam member 12 at the end of the connection in a final position C in which both the front and rear end portions 11 and 10 of the rails 9 are attached to the shell 2.

As the cam member 12 pivots, it also causes the rails 9 to rotate about a second transverse axis W substantially parallel to the formerly recited axis Y and defined by the rear seat 6 of the shell 2.

According to a preferred, non exclusive embodiment of the invention, the front seat 7 of the shell 2 may be defined by a special profile 16 of the front portion 4 of a shell 2, which is suitably downwardly and inwardly folded in the radial direction with respect to the longitudinal axis L.

Figure 2:
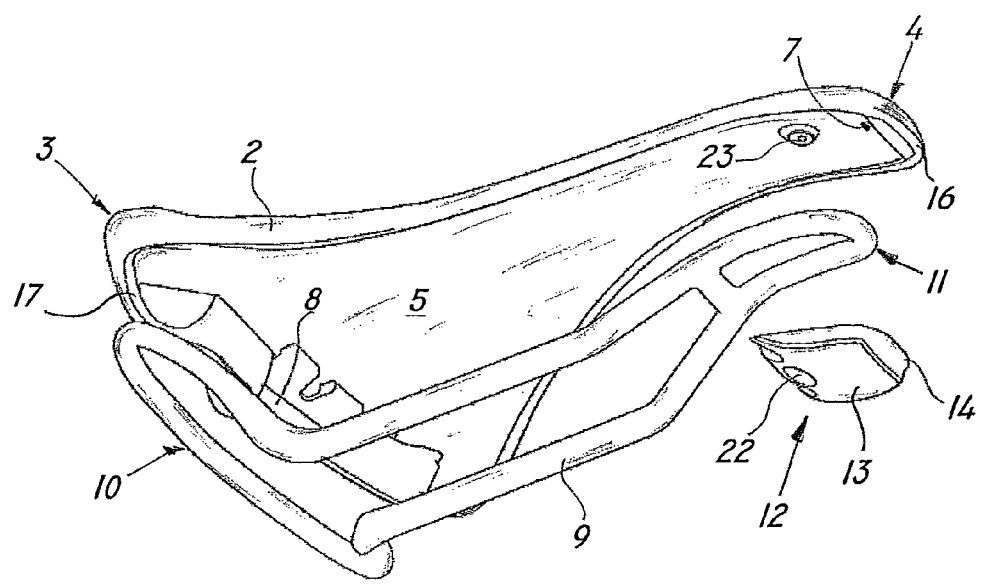
FIG. 2 is a bottom perspective exploded view of the structure of FIG. 1.
Figure 3:
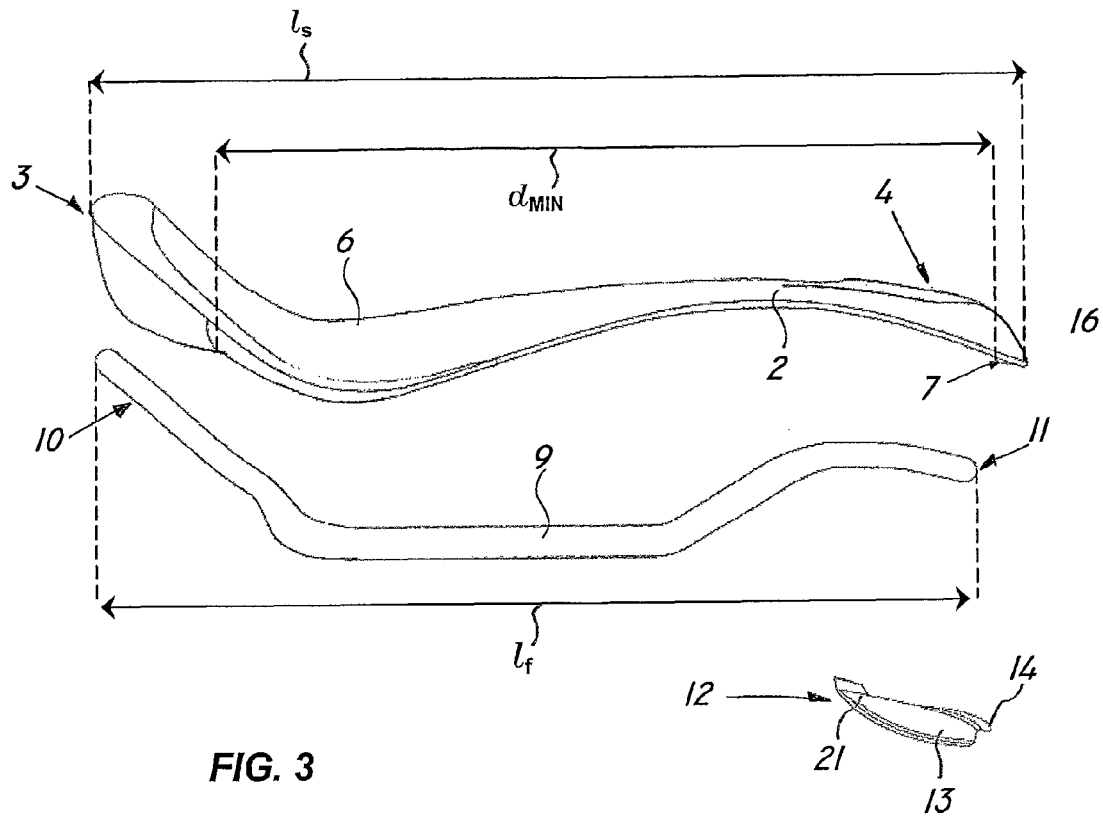
FIG. 3 is an exploded side view of the structure of FIG. 1.

Furthermore, as more clearly shown in FIGS. 1 and 2, the rear seat 8 may be also defined by an edge portion 17 of the rear 3 of the shell 2, which is folded in such a manner as to form an undercut to allow snap fit engagement of the rear end portion 10 of the rails 9.

Therefore, the second axis of rotation W of the rails 9 may be substantially parallel to the extension of the rear seat 8 so defined.

In the illustrated arrangement, the shaped profile 16 that defines the front seat 7 of the shell 2 may have a first substantially convex and rounded portion 18 which is connected to a second substantially concave and at least partially planar portion 19.

These two portions 18, 19 will thence define, for the tooth portion 14, one surface of rotation about the first transverse axis Y and one slide surface respectively.

Thus, the tooth portion 14 may be urged by the rails 9 to slide into the front seat 7 for stable connection with the rails 9 and the shell 2 and secured hold of such connection.

Nevertheless, in order to increase the holding force and improve the safety of the whole structure 1, further means may be provided for fastening the cam member 12 to the shell 2.

For instance, the cam member 12 may have, at its rear end 21, one or more through holes 22 for passage of a connection member therethrough and insertion thereof in another hole, possibly threaded, formed on the lower surface 5 of the shell 2.

The connection member, not shown and well known, may include a screw, a nut, a fixing pin or similar member and will have the purpose of improving the stability of the connection between the cam member 12 and the shell 2 and thence between the rails 9 and the shell 2.

Figure 8:
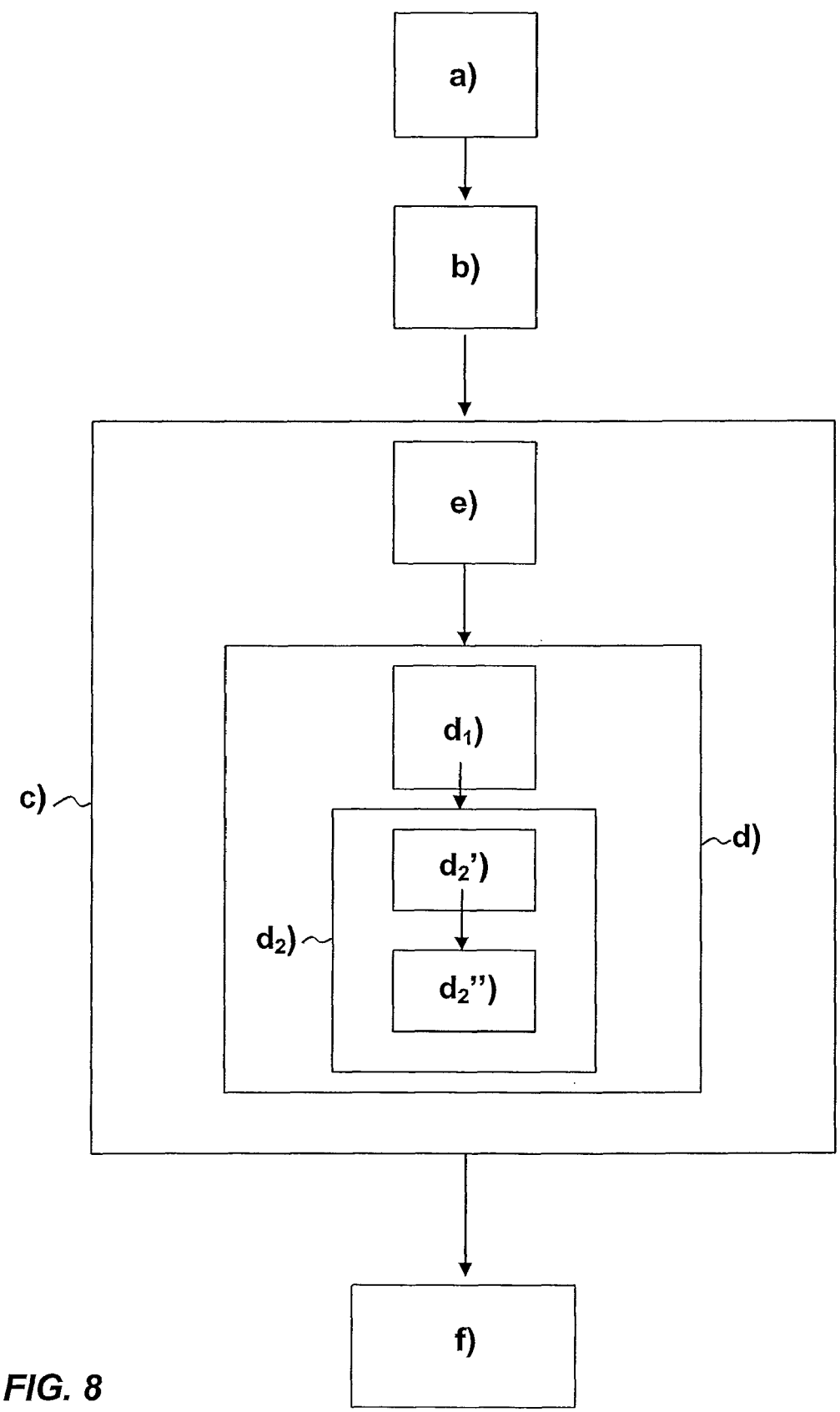
FIG. 8 shows a flowchart of a method of assembly of a saddle structure of the invention.

FIG. 8 is a diagrammatic view of a method of assembly of a bicycle saddle structure 1 as described hereinbefore.

The method includes a step a) of providing a load-bearing shell 2 and a step b) of providing rails 9, both as described above, and a step c) of connecting the rails 9 and the shell 2 together.

According to the invention, the connection step c) includes a step d) of providing a cam connection member 12 and the interposition thereof between the front seat 7 of the shell 2 and the front portion 11 of the rails 9.

Preferably, the step c) may further include an initial step e) of introducing the rear end portion 10 of the rails 9 in the rear seat 8 of the shell 2.

The step d) may in turn include a step $d_1$) of attaching the front end portion 11 of the rails 9 to the cam member 12, such as by snap fit engagement of the former into the shaped groove 15 formed in the main body 13 of the cam member 12.

Then, the cam member 12 attached to the rails 9 may be fitted, in step $d_2$) into the front attachment seat 7 of the shell 2.

This step may include a first step $d_2'$) in which the cam member 12 is caused to rotate about the first transverse axis Y through a first angle $ø_1$, whose value will be determined by the radius of curvature r of the convex portion 18 of the front seat 7.

This will cause simultaneous rotation of the rails 9 about the third axis W, and gradual and progressive axial compression thereof to a maximum value at a top dead center 24, corresponding to the connection point between the first 18 and second portions 19 of the shaped profile 16 of the front seat 7.

Also, the action of the cam member 12 on the front seat 7 will cause tension of the shell 2, which is also exerted in a progressive and controlled manner.

Particularly, the cam member 12 will have such an effect that the difference between the maximum compression and tension values of the rails 9 and the shell 2 respectively, as measured along the longitudinal axis L, will fall in a range from 0.20 mm and 0.40 mm, and will be preferably about 0.25 mm. These values will depend on the inherent properties of the materials that form both the shell 2 and the rails 9 and on the shapes thereof.

Upon reaching the top dead center 24, the cam member 12 will perform a combined rotational and translational motion, in step $d_2''$, on the second portion 19 of the inner surface of the front seat 7.

Thus, the rails 9 will be subjected to partial decompression and thence partial stretching, that will facilitate full insertion of the tooth formation 14 in the front seat 7 and thus stable connection of the front portion 11 of the rails 9 to the front portion 4 of the shell 2.

Indeed, the thrust exerted by the rails 9 will hold the cam member 12 secured against the front seat 7, while also keeping the shell 2 under tensile stress.

This tensile stress applied on the shell 2 will enhance the flexural strength thereof 10 and provide the apparent advantage of allowing the use of a lighter shell 2, while achieving equal mechanical properties.

Furthermore, the particular configuration of the cam member 12 and the specific connection thereof with the rails 9 and the shell 2 will allow the whole step c) of connection of the front portion 11 of the rails 9 to the front portion 4 of the shell 2 may be carried out by operating on the cam member 12 by a simple movement of a hand and without using special means or tools having lever functions.

For more stable attachment of the cam member 12 to the shell 2, a final step f) may be provided in which the cam member 12 is fixed to the shell 2 using one or more fastening members of the screw or the like type, in a manner known per se.

The above disclosure clearly shows that the invention fulfills the intended objects and particularly meets the requirement of providing a bicycle saddle structure that has both light weight and high strength.

Thanks to the particular configuration of the cam member 12, the structure may be assembled in a very simple and quick manner with a simple hand gesture, without requiring the various parts of the structure to withstand impulsive loads during assembly, which might affect their structural integrity.

The structure and method of the invention are susceptible to a number of changes and variants, within the inventive concept disclosed in the annexed claims. All the details thereof may be replaced by other technically equivalent parts, and the materials may vary depending on different needs, without departure from the scope of the invention.

While the structure and method have been described with particular reference to the accompanying figures, the numerals referred to in the disclosure and claims are only used for the sake of a better intelligibility of the invention and shall not be intended to limit the claimed scope in any manner.

The invention claimed is:

1. A bicycle saddle structure for attachment to a bicycle frame, comprising:
   a load-bearing shell defining a longitudinal axis (L) and having an elongate front portion, a widened rear portion and a bottom surface with a front seat and a rear seat formed therein at a predetermined minimum distance ($d_{MIN}$) therebetween;
   rails for attachment of said shell to a bicycle frame and having a rear end portion designed to fit into said rear seat and a front end portion designed to interact with said front seat, said rails having a maximum longitudinal extension ($l_f$) longer than said predetermined minimum distance ($d_{MIN}$) between said seats;
   wherein the saddle structure includes a cam connection member comprising a main body having a top surface which is designed to be interposed between said front seat of said shell and said front portion of said rails to cause said shell to be snap fitted to said rails, further comprising a groove formed in the top surface of the main body of the cam member, wherein the front portion of the rails is configured to be frictionally engaged with the groove to enable compression of the rails in at least a longitudinal direction to provide said snap fit of said rails to said shell;
   wherein the cam connection member includes a tooth formation to be fitted into an upwardly facing at least partially planar portion of the front seat that is configured to cause pivotal movement of the cam connection member during assembly; and
   wherein the groove comprises a recess that opens upwardly out of a plane of the recess to receive the rails from above during said assembly and the recess opens rearwardly to receive said rails from the rear once snap fitted in an assembled state.

2. The saddle structure as claimed in claim 1, wherein said front seat defines a first transverse axis of rotation (Y), said cam connection member having a main body and wherein said tooth formation comprises a front tooth formation to be fitted into said front seat by rotation about said first transverse axis (Y).

3. The saddle structure as claimed in claim 2, wherein said tooth formation of said cam member has a shape that substantially matches a shape of said front seat of said shell.

4. The saddle structure as claimed in claim 1, wherein said groove of said cam member comprises a groove designed to receive a countershaped front end portion of said rails.

5. The saddle structure as claimed in claim 4, wherein said tooth formation and said groove are longitudinally offset so that, when said tooth formation fits into said front seat of said shell, a partial rotation thereof about said first axis (Y) by a first predetermined angle ($\phi_1$) causes the rails to be partially shortened and the shell to be elongated, and a full coupled rotation pivoting motion thereof through a second angle ($\phi_2$) about the first transverse axis (Y) causes at least partial stretching of said rails, for snap fit of said rails, said cam member and said shell.

6. The saddle structure as claimed in claim 5, wherein said rear seat defines a second transverse axis of rotation (W), substantially parallel to the first axis (Y), said rear end portion of said rails being susceptible of pivoting about said second transverse axis of rotation (W) upon rotation of said cam member about said first axis (Y) with said front portion fitted in said groove.

7. The saddle structure as claimed in claim 1, wherein said front seat is defined by a shaped profile of said front portion of said shell, said profile being substantially downwardly and inwardly folded.

8. The saddle structure as claimed in claim 7, wherein said shaped profile defining said front seat has a first substantially convex and rounded portion which is connected to a second substantially concave and the at least partially planar portion defining, for said tooth formation, one surface of rotation about said first transverse axis (Y) and one slide surface.

9. The saddle structure as claimed in claim 2, wherein said main body of said cam member has, at its rear end, means for fastening said cam member to said shell.

10. The saddle structure as claimed in claim 9, wherein said fastening means include at least one hole for a screw connection member to extend therethrough and be introduced in a corresponding hole of said shell.

11. A method of assembly of a bicycle saddle structure to be attached to a bicycle frame, comprising the steps of:
   a) providing a load-bearing shell that defines a longitudinal axis (L) and has an elongate front portion, a widened rear portion, a bottom surface with a front seat and a rear seat formed therein at a predetermined minimum distance ($d_{MIN}$) therebetween along said longitudinal axis (L);
   b) providing rails having a maximum longitudinal extension ($l_f$) longer than said predetermined minimum distance ($d_{MIN}$) between said seats, a rear end portion designed to fit into said rear seat and a front end portion designed to interact with said front seat of said shell;
   c) connecting together said rails to said shell for attachment of said saddle structure to a bicycle frame;
   wherein said connection step c) includes the provision d) of a cam connection member comprising a main body having a top surface and its interposition between said front seat of said shell and said front portion of said rails to cause said rails to be snap fitted to said shell, further comprising a groove formed in the top surface of the main body of the cam member, wherein the front portion of the rails is configured to be frictionally engaged with the groove to enable compression of the rails in at least a longitudinal direction to provide said snap fit of said rails to said shell;
   wherein the cam connection member includes a tooth formation to be fitted into an upwardly facing at least partially planar portion of the front seat that is configured to cause pivotal movement of the cam connection member during assembly; and
   wherein the groove comprises a recess that opens upwardly out of a plane of the recess to receive the rails from above during said assembly and the recess opens rearwardly to receive said rails from the rear once snap fitted in an assembled state.

12. The method as claimed in claim 11, wherein said connection step c) comprises an initial step e) in which said rear portion of said rails fits into said rear seat of said shell.

13. The method as claimed in claim 11, wherein said connection step c) further comprises a step $d_1$) in which said front portion of said rails is attached to said cam member and a later step $d_2$) in which said cam member joined to said rails fits into said front seat of said shell.

14. The method as claimed in claim 13, further comprising a fitting step $d_2'$) in which said cam member undergoes a rotation about a first transverse axis (Y) by a first predetermined rotation angle $\phi_1$, to cause progressive and controlled shortening of said rails and elongation of said shell, and a second step $d_2''$) of combined rotation and translation of said cam member in said front seat to allow partial stretching of said rails and facilitate stable fit of the tooth formation in said front seat.

15. The method as claimed in claim 14, wherein a maximum difference between maximum shortening and elongation values of said rails and said shell, respectively, falls in a range from 0 mm to 2.50 mm.

16. The method as claimed in claim 11, further including a final step f) in which said cam member is secured to said shell by a fastening member.

17. The method as claimed in claim 14, wherein a maximum difference between maximum shortening and elongation values of said rails and said shell, respectively, is about 0.50 mm.

* * * * *